(12) United States Patent
Hanrahan et al.

(10) Patent No.: US 11,781,479 B2
(45) Date of Patent: Oct. 10, 2023

(54) TURBOFAN GAS TURBINE ENGINE WITH COMBUSTED COMPRESSOR BLEED FLOW

(71) Applicant: RTX Corporation, Farmington, CT (US)

(72) Inventors: Paul R. Hanrahan, Sedona, AZ (US); Daniel Bernard Kupratis, Wallingford, CT (US); Christopher J. Hanlon, Sturbridge, MA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/313,605

(22) Filed: May 6, 2021

(65) Prior Publication Data
US 2022/0356840 A1 Nov. 10, 2022

(51) Int. Cl.
*F02C 7/052* (2006.01)

(52) U.S. Cl.
CPC ......... *F02C 7/052* (2013.01); *F05D 2220/32* (2013.01)

(58) Field of Classification Search
CPC .... F02C 7/052; F02C 9/18; F02C 3/04; F02C 3/10; F02C 3/13; F05D 2220/32
See application file for complete search history.

(56) References Cited

U.S. PATENT DOCUMENTS

| | | | | |
|---|---|---|---|---|
| 2,672,726 A * | 3/1954 | Wolf | ......................... | F02C 3/36 60/225 |
| 3,677,012 A * | 7/1972 | Batscha | .................... | F02K 3/11 60/262 |
| 3,765,170 A * | 10/1973 | Nakamura | .............. | F02C 6/003 60/39.17 |
| 4,222,235 A * | 9/1980 | Adamson | ................ | F02K 3/075 60/262 |
| 4,858,428 A * | 8/1989 | Paul | .......................... | F02C 9/18 60/39.17 |
| 6,205,771 B1 * | 3/2001 | Rowe | ...................... | F04D 27/02 60/39.27 |
| 6,385,959 B1 * | 5/2002 | Montoya | ................... | F02C 3/14 60/773 |

(Continued)

FOREIGN PATENT DOCUMENTS

DE 1081277 B 5/1960

OTHER PUBLICATIONS

Extended European Search Report for Application No. 22172188.9 dated Sep. 30, 2022.

*Primary Examiner* — Steven M Sutherland
(74) *Attorney, Agent, or Firm* — CANTOR COLBURN LLP

(57) ABSTRACT

A gas turbine engine includes a core section including a compressor, a main combustor, and a main turbine. Combustion products from the main combustor drive rotation of the turbine and the compressor. A power turbine is fluidly connected to the main turbine and driven by exhaust from the main turbine. The gas turbine engine further includes a fan section having a fan rotor located fluidly upstream of the core section. The power turbine is operably connected to the fan rotor to drive rotation of the fan rotor via rotation of the power turbine. The gas turbine engine includes a bleed arrangement having one or more bleed passages configured to divert a bleed airflow from the compressor around the main combustor and main turbine, and reintroduce the bleed airflow into the power turbine.

11 Claims, 2 Drawing Sheets

(56) References Cited

U.S. PATENT DOCUMENTS

| | | |
|---|---|---|
| 7,891,163 B2 | 2/2011 | Richards |
| 9,046,056 B2 | 6/2015 | Lerg |
| 2006/0096272 A1 | 5/2006 | Baughman et al. |
| 2011/0023446 A1* | 2/2011 | Avellan .................... F02K 3/06 |
| | | 60/39.23 |
| 2016/0347463 A1 | 12/2016 | Negulescu |
| 2019/0017437 A1* | 1/2019 | Tangirala ................. F02C 9/18 |

* cited by examiner

TURBOFAN GAS TURBINE ENGINE WITH COMBUSTED COMPRESSOR BLEED FLOW

BACKGROUND

Exemplary embodiments pertain to the art of gas turbine engines, and in particular to compressors for and sand or other particulate separation in turbofan gas turbine engines.

Typical gas turbine engine compressors are sized for maximum rated thrust, which makes them larger than is necessary for part-power cruise. This results in relatively high specific fuel consumption (SFC) which reduces available range. Also, in some applications, it is desired to reduce the ingestion of particulate matter such as sand, dust or the like into the core section of the gas turbine engine since this can cause erosion of components in the high pressure compressor, combustor and turbine sections of the gas turbine engine.

BRIEF DESCRIPTION

In one embodiment, a gas turbine engine includes a core section including a compressor, a main combustor, and a main turbine. Combustion products from the main combustor drive rotation of the turbine and the compressor. A power turbine is fluidly connected to the main turbine and driven by exhaust from the main turbine. The gas turbine engine further includes a fan section having a fan rotor located fluidly upstream of the core section. The power turbine is operably connected to the fan rotor to drive rotation of the fan rotor via rotation of the power turbine. The gas turbine engine includes a bleed arrangement having one or more bleed passages configured to divert a bleed airflow from the compressor around the main combustor and main turbine, and reintroduce the bleed airflow into the power turbine.

Additionally or alternatively, in this or other embodiments a bleed burner is located in the bleed passage.

Additionally or alternatively, in this or other embodiments the bleed burner is selectably operated during operation of the gas turbine engine.

Additionally or alternatively, in this or other embodiments the bleed arrangement includes a bleed inlet manifold and a bleed outlet manifold. The one or more bleed passages extend between the bleed inlet manifold and the bleed outlet manifold.

Additionally or alternatively, in this or other embodiments a bleed burner is located in each bleed passage of the one or more bleed passages.

Additionally or alternatively, in this or other embodiments the bleed arrangement diverts the bleed airflow from a low pressure compressor section of the gas turbine engine.

Additionally or alternatively, in this or other embodiments the one or more bleed passages are selectably opened and/or closed.

Additionally or alternatively, in this or other embodiments a variable pitch vane is located at the power turbine to selectably moderate and control an airflow entering the power turbine.

In another embodiment, a method of operating a gas turbine engine includes operating a core section of the gas turbine engine. The core section includes a compressor, a main combustor and a main turbine, such that combustion products from the main combustor drives rotation of the turbine and the compressor. The method further includes urging rotation of a power turbine fluidly connected to the main turbine by exhaust from the main turbine, driving rotation of a fan rotor operably connected to the power turbine via rotation of the power turbine, diverting a bleed airflow from the compressor around the main combustor and main turbine via one or more bleed passages, and reintroducing the bleed airflow into the power turbine.

Additionally or alternatively, in this or other embodiments a bleed burner located in the one or more bleed passages is selectably operated to increase a power output of the turboshaft engine.

Additionally or alternatively, in this or other embodiments the bleed airflow is diverted from a low pressure compressor section of the gas turbine engine.

Additionally or alternatively, in this or other embodiments the one or more bleed passages are selectably opened and/or closed Additionally or alternatively, in this or other embodiments the airflow entering the power turbine is selectably moderated and controlled via one or more variable pitch vanes disposed at the power turbine.

In yet another embodiment, a gas turbine engine includes a high pressure spool that interconnects a high pressure compressor and a high pressure turbine, a low pressure spool that interconnects a low pressure compressor and a low pressure turbine, and a fan spool that interconnects a power turbine and a fan rotor. A main combustor is located between the high pressure compressor and the high pressure turbine. The gas turbine engine further includes a bleed arrangement including one or more bleed passages configured to divert a bleed airflow from the low pressure compressor around the main combustor, the high pressure turbine and the low pressure turbine, and reintroduce the bleed airflow into the power turbine.

Additionally or alternatively, in this or other embodiments the bleed airflow is diverted from an exit of the low pressure compressor.

Additionally or alternatively, in this or other embodiments a bleed burner is located in the bleed passage.

Additionally or alternatively, in this or other embodiments the bleed burner is selectably operated during operation of the gas turbine engine.

Additionally or alternatively, in this or other embodiments the one or more bleed passages are selectably opened and/or closed.

Additionally or alternatively, in this or other embodiments a variable pitch vane is located at the power turbine to selectably moderate and control an airflow entering the power turbine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
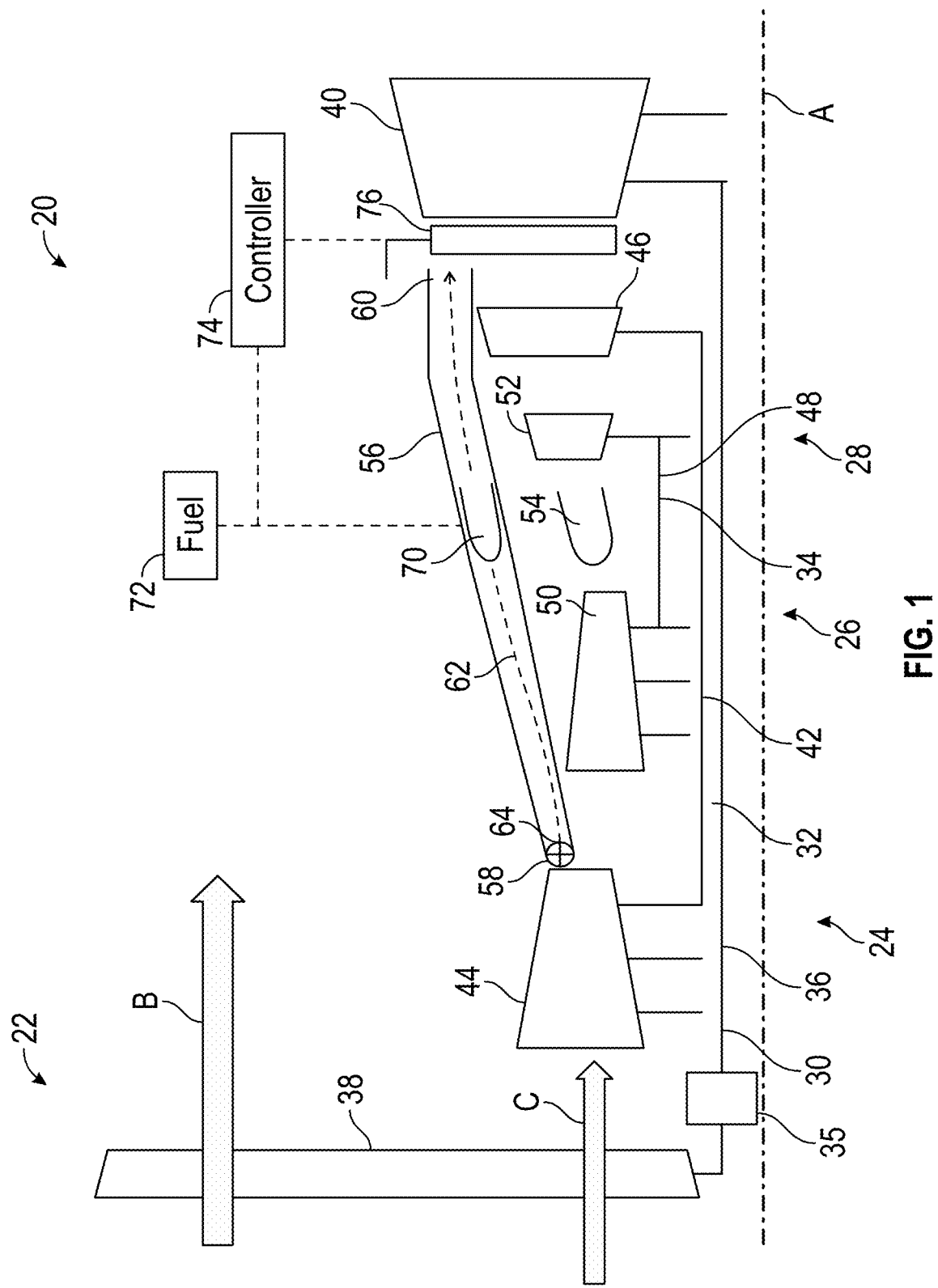
FIG. 1 is a schematic illustration of an embodiment of a turbofan engine.

FIG. 1 schematically illustrates a gas turbine engine 20. The gas turbine engine 20 is disclosed herein as a turbofan engine that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. The exemplary engine 20 generally includes a fan spool 30, a low speed spool 32 and a high speed spool 34 mounted for rotation about an engine central longitudinal axis A.

The fan spool 30 generally includes an inner shaft 36 that interconnects a fan 38 and a power turbine 40, which may be coupled through a reduction gearbox 35. The low speed spool 32 includes an intermediate shaft 42 that interconnects a low pressure compressor 44 and a low pressure turbine 46, and the high speed spool 34 includes an outer shaft 48 that interconnects a high pressure compressor 50 and high pressure turbine 52. The high pressure compressor 50 is sized and configured for optimal operation at a part-power condition, maximum core thrust (MCT), which is less than maximum rated thrust (MRT). A main combustor 54 is arranged in the exemplary gas turbine 20 between the high pressure compressor 50 and the high pressure turbine 52. The inner shaft 36, the intermediate shaft 42 and the outer shaft 48 are concentric and rotate about the engine central longitudinal axis A which is collinear with their longitudinal axes. The core airflow is compressed by the low pressure compressor 44 then the high pressure compressor 50, mixed and burned with fuel in the main combustor 54, then expanded over the high pressure turbine 52, low pressure turbine 46 and the power turbine 40. The turbines 40, 46, 52 rotationally drive the respective fan spool 30, low speed spool 32 and high speed spool 34 in response to the expansion.

A bleed passage 56 extends from a bleed inlet 58 at the low pressure compressor 44 to a bleed outlet 60 between the power turbine 40 and the low pressure turbine 46. The bleed passage is configured to selectably direct a bleed airflow 62 from the low pressure compressor 44 to the power turbine 40, bypassing the high pressure compressor 50, the main combustor 54, the high pressure turbine 52 and the low pressure turbine 46. The bleed airflow 62 along the bleed passage 56 is selectably controlled by a bleed valve 64 located at, for example, the bleed inlet 58 as shown, or alternatively along the bleed passage 56.

Figure 2:
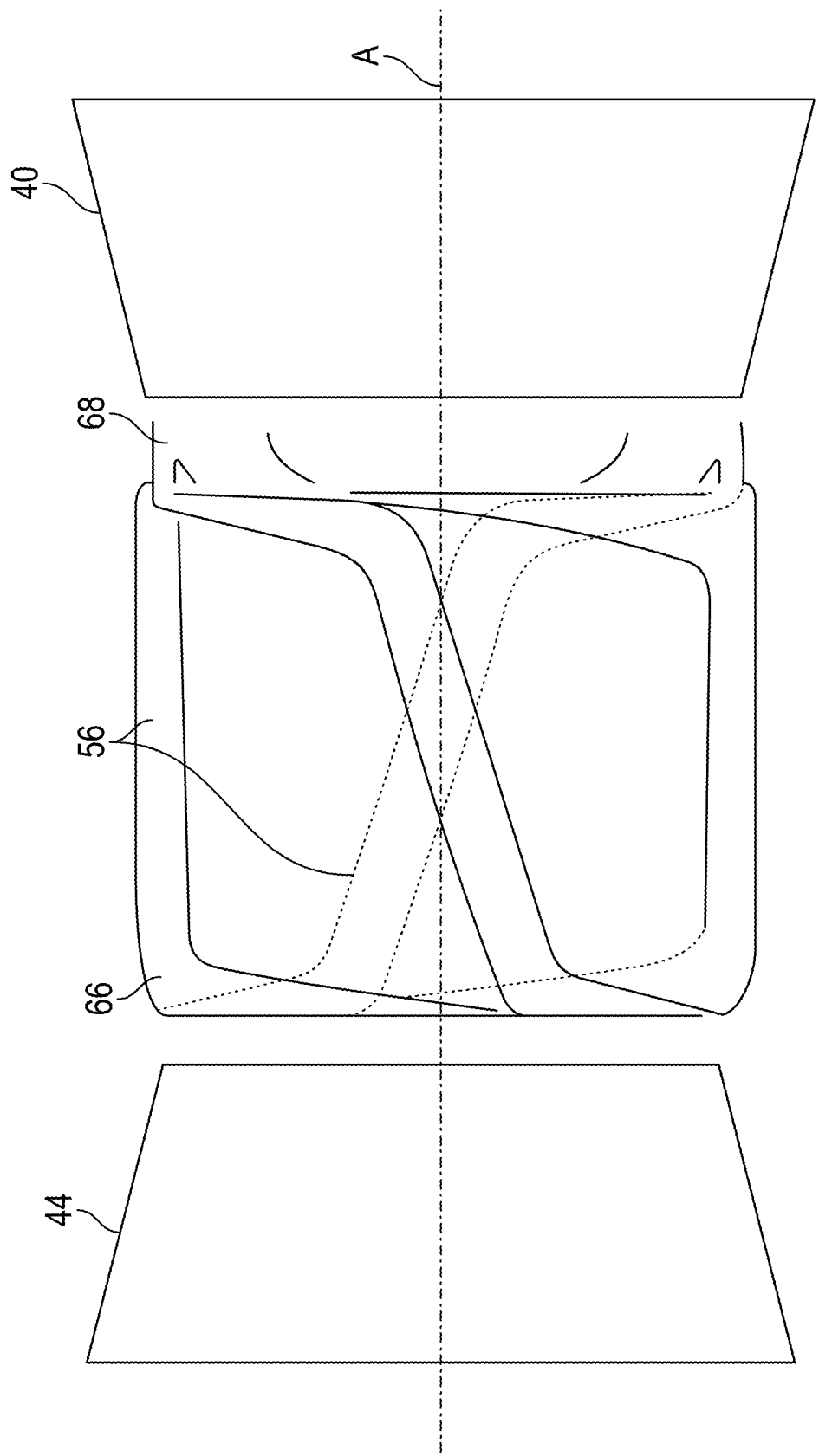
FIG. 2 is a schematic illustration of an embodiment of a bleed passage arrangement of a turbofan engine.

Referring now to FIG. 2, in some embodiments a bleed inlet manifold 66 is located at the low pressure compressor 44 and extends circumferentially around the engine central longitudinal axis A. Similarly, a bleed outlet manifold 68 is located at between the low pressure turbine 46 and the power turbine 40 and extends circumferentially around the engine central longitudinal axis A. The bleed inlet manifold 66 and the bleed outlet manifold 68 extend circumferentially about the engine central longitudinal axis A, and are for example, toroidal in configuration. As best shown in FIG. 2, a plurality of bleed passages 56 extend from the bleed inlet manifold 66 to the bleed outlet manifold 68. The bleed inlet manifold 66 distributes the bleed airflow 62 to the plurality of bleed passages 56, and the bleed outlet manifold 68 collects the bleed airflow 62 from the plurality of bleed passages 56. Some embodiments, such as shown in FIG. 2, include four bleed passages 56 equally circumferentially spaced about the engine central longitudinal axis A. One skilled in the art will readily appreciate that other quantities of bleed passages 56 may be utilized, and that the circumferential spacing of the bleed passages 56 may be varied. Further, as illustrated in FIG. 2, the bleed passages 56 may be skewed circumferentially between the bleed inlet manifold 66 and the bleed outlet manifold 68.

Referring again to FIG. 1, the bleed passages 56 include a bleed burner 70. The bleed burner 70 is operably connected to a fuel source 72 and a controller 74, such as a full authority digital engine control (FADEC). The bleed burner 70 is configured such that, when operated together with the main combustor 54, the gas turbine engine 20 can achieve maximum rated thrust (MRT). In operation, in normal conditions when engine power up to MCT is needed, the gas turbine engine 20 operates utilizing the main combustor 54 without igniting the bleed burner 70. When power in excess of MCT is requested, such as at takeoff or during an operation maneuver, the controller 74 directs fuel from the fuel source 72 to the bleed burner 70 and ignites the bleed burner 70 so that engine power greater than MCT and up to MRT can be achieved, without increasing thermal stress on the high pressure compressor 50 and/or the high pressure turbine 52 and the low pressure turbine 46.

In some embodiments, the power turbine 40 includes one or more features to selectably moderate and control the airflow entering the power turbine 40. In some embodiments, this feature is one or more variable pitch vanes 76 located at an inlet to the power turbine 40. For example, the variable pitch vanes 76 are connected to the controller 74 and operated such that the variable pitch vanes 76 are in a first position when the bleed burner 70 is operated and in a second position when the bleed burner 70 is not operated.

Further, the low pressure compressor 44 centrifuges any particulates in the core airflow toward an outer diameter of the low pressure compressor 44 and into the bleed passage 56. Thus, these particulates bypass the high pressure compressor 50, the high pressure turbine 52 and the low pressure turbine 46 and reduces erosion of those components.

The configurations of the gas turbine engine 20 disclosed herein have benefits including lower specific fuel consumption at power conditions at MCT or below due to the reduced size of the high pressure compressor 50 when compared to a typical gas turbine engine, and improves the service life of the turbine components of the gas turbine engine 20 due to the capture of fine particulates via the bleed passage 56.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine, comprising:
   a core section including:
      a compressor;
      a main combustor; and
      a main turbine, such that combustion products from the main combustor drives rotation of the turbine and the compressor;
   a power turbine fluidly connected to the main turbine and driven by exhaust from the main turbine;
   a fan section including a fan rotor disposed fluidly upstream of the core section, the power turbine operably connected to the fan rotor to drive rotation of the fan rotor via rotation of the power turbine;
   a bleed arrangement including two or more bleed passages spaced apart circumferentially about an engine central longitudinal axis, the two or more bleed passages configured to divert a bleed airflow from the compressor around the main combustor and main turbine, and reintroduce the bleed airflow into the power turbine;
   a bleed burner disposed in the two or more bleed passages, the bleed airflow selectably combusted by selective operation of the bleed burner;
   a variable pitch vane disposed at the power turbine to selectably moderate and control an airflow entering the power turbine; and
   a controller operably connected to the bleed burner and to the variable pitch vane, the controller configured to command movement of the variable pitch vane to a first position when the bleed burner is operated and to a second position when the bleed burner is not operated.

2. The gas turbine engine of claim 1, wherein the bleed arrangement includes:
   a bleed inlet manifold; and
   a bleed outlet manifold:
   wherein the two or more bleed passages extend between the bleed inlet manifold and the bleed outlet manifold.

3. The gas turbine engine of claim 2, wherein the bleed burner is disposed in each bleed passage of the two or more bleed passages.

4. The gas turbine engine of claim 1, wherein the bleed arrangement diverts the bleed airflow from a low pressure compressor section of the gas turbine engine.

5. The gas turbine engine of claim 1, where the two or more bleed passages are selectably opened and/or closed.

6. A method of operating a gas turbine engine, comprising:
   operating a core section of the gas turbine engine, the core section including:
      a compressor;
      a main combustor; and
      a main turbine, such that combustion products from the main combustor drives rotation of the turbine and the compressor;
   urging rotation of a power turbine fluidly connected to the main turbine by exhaust from the main turbine;
   driving rotation of a fan rotor operably connected to the power turbine via rotation of the power turbine;
   diverting a bleed airflow from the compressor around the main combustor and main turbine via two or more bleed passages spaced apart circumferentially about an engine central longitudinal axis, and reintroducing the bleed airflow into the power turbine;
   selectably combusting the bleed airflow via operation of a bleed burner disposed in the two or more bleed passages to increase a power output of the gas turbine engine; and
   selectably moderating and controlling the airflow entering the power turbine via one or more variable pitch vanes disposed at the power turbine;
   wherein a controller is configured to move the variable pitch vane a first position when the bleed burner is operated and to a second position when the bleed burner is not operated.

7. The method of claim 6, further comprising diverting the bleed airflow from a low pressure compressor section of the gas turbine engine.

8. The method of claim 6, wherein the one two or more bleed passages are selectably opened and/or closed.

9. A gas turbine engine, comprising:
   a high pressure spool that interconnects a high pressure compressor and a high pressure turbine;
   a low pressure spool that interconnects a low pressure compressor and a low pressure turbine;
   a fan spool that interconnects a power turbine and a fan rotor;
   a main combustor disposed between the high pressure compressor and the high pressure turbine;
   a bleed arrangement including two or more bleed passages spaced apart circumferentially about an engine central longitudinal axis, the two or more bleed passages configured to divert a bleed airflow from the low pressure compressor around the main combustor, the high pressure turbine and the low pressure turbine, and reintroduce the bleed airflow into the power turbine;
   a bleed burner disposed in the two or more bleed passages,
   the bleed airflow is selectably combusted by selective operation of the bleed burner;
   a variable pitch vane disposed at the power turbine to selectably moderate and control an airflow entering the power turbine; and
   a controller operably connected to the bleed burner and to the variable pitch vane, the controller configured to command movement of the variable pitch vane to a first position when the bleed burner is operated and to a second position when the bleed burner is not operated.

10. The gas turbine engine of claim 9, wherein the bleed airflow is diverted from an exit of the low pressure compressor.

11. The gas turbine engine of claim 9, where the two or more bleed passages are selectably opened and/or closed.

* * * * *